United States Patent
Wang

(10) Patent No.: US 10,263,454 B2
(45) Date of Patent: Apr. 16, 2019

(54) CHARGER AND POWER DELIVERY CONTROL CHIP AND CHARGING METHOD THEREOF

(71) Applicant: VIA Technologies, Inc., New Taipei (TW)

(72) Inventor: Tze-Shiang Wang, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 151 days.

(21) Appl. No.: 15/488,525

(22) Filed: Apr. 17, 2017

(65) Prior Publication Data

US 2018/0062400 A1  Mar. 1, 2018

Related U.S. Application Data

(60) Provisional application No. 62/381,616, filed on Aug. 31, 2016.

(30) Foreign Application Priority Data

Mar. 2, 2017  (TW) .............................. 106106874 A

(51) Int. Cl.
| | |
|---|---|
| H01M 10/44 | (2006.01) |
| H01M 10/46 | (2006.01) |
| H02J 7/04 | (2006.01) |
| H02J 7/00 | (2006.01) |

(52) U.S. Cl.
CPC ....... H02J 7/045 (2013.01); *H02J 2007/0096* (2013.01)

(58) Field of Classification Search
CPC ...... H02J 7/0021; H02J 7/0036; H02J 7/0052; H02J 7/007; H02J 7/0072; H02J 2007/0095; H02J 7/04; H02J 7/042

USPC ....... 320/107, 125, 128, 132, 152, 162, 163, 320/164

See application file for complete search history.

(56) References Cited

U.S. PATENT DOCUMENTS

| | | | | |
|---|---|---|---|---|
| 6,008,624 | A * | 12/1999 | Bergstrom | .............. H02J 7/022 |
| | | | | 320/128 |
| 6,054,865 | A | 4/2000 | Bald et al. | |
| 2012/0161797 | A1 * | 6/2012 | Hein | ..................... G01R 31/42 |
| | | | | 324/705 |

FOREIGN PATENT DOCUMENTS

| | | |
|---|---|---|
| CN | 101789580 | 7/2010 |
| CN | 103293369 | 9/2013 |
| CN | 105279314 | 1/2016 |
| TW | 200700970 | 1/2007 |

(Continued)

OTHER PUBLICATIONS

"Office Action of Taiwan Counterpart Application," dated Oct. 5, 2017, p. 1-p. 3.

*Primary Examiner* — Edward Tso
(74) *Attorney, Agent, or Firm* — JCIPRNET

(57) ABSTRACT

A charger and a power delivery control chip and a charging method thereof are provided. Resistance values of equivalent resistances corresponding to a power supply bus are calculated according to a charging current and voltage sensing signals respectively provided by chips of a first connector and a second connector. A charging voltage supplied to the power supply bus is adjusted according to a target charging voltage, a current charging current, and variations of the resistance values of the equivalent resistances corresponding to the power supply bus.

36 Claims, 4 Drawing Sheets

(56) References Cited

FOREIGN PATENT DOCUMENTS

TW 201128207 8/2011

* cited by examiner

CHARGER AND POWER DELIVERY CONTROL CHIP AND CHARGING METHOD THEREOF

CROSS-REFERENCE TO RELATED APPLICATION

This application claims the priority benefits of U.S. provisional application Ser. No. 62/381,616, filed on Aug. 31, 2016 and Taiwan application serial no. 106106874, filed on Mar. 2, 2017. The entirety of each of the above-mentioned patent applications is hereby incorporated by reference herein and made a part of this specification.

BACKGROUND OF THE INVENTION

Field of the Invention

The invention relates to an electronic device and more particularly relates to a charger and a power delivery control chip and a charging method thereof.

Description of Related Art

As a consequence of the ever-changing technology, mobile electronic devices such as smart phones, tablet computers, and so on have become indispensable to our life. For such mobile electronic devices, charging is always an issue that needs to be addressed. In general, different electronic devices may adopt different charging cable specifications, and the charging cables manufactured by different manufacturers may not have the same characteristics. As the charging cable continues to be used, aging may cause the characteristics of the charging cable to change. For example, the resistance value of the charging cable may increase. However, different charging cables may age differently due to the difference in specification and material. Thus, how to perform charging accurately and safely according to the degrees of aging of different charging cables is a very important issue.

SUMMARY OF THE INVENTION

The invention provides a charging device and a charger and a charging method thereof for charging accurately and safely according to the degrees of aging of different cables.

A charger of the invention is adapted to charge an electronic device via a cable. An end of the cable provides a target charging voltage to the electronic device via a first connector and the other end of the cable is coupled to the charger via a second connector. The charger includes an AC/DC conversion circuit and a power delivery control chip. The AC/DC conversion circuit is coupled to a power supply bus of the cable to covert an AC voltage into a DC voltage, so as to provide a charging voltage and a charging current. The power delivery control chip calculates a first equivalent resistance according to a first voltage sensing signal provided from a first chip of the first connector, a current charging voltage, and a current charging current, and adjusts the charging voltage provided by the AC/DC conversion circuit according to the first equivalent resistance, the current charging current, and the target charging voltage. The first equivalent resistance is a resistance corresponding to a section on the power supply bus between the first chip and the charger.

The invention further provides a charging method of a charger. The charger is adapted to charge an electronic device via a cable. An end of the cable provides a target charging voltage to the electronic device via a first connector and the other end of the cable is coupled to the charger via a second connector. The charging method of the charger includes the following steps. An AC voltage is converted into a DC voltage, so as to provide a charging voltage and a charging current. A first equivalent resistance is calculated according to a first voltage sensing signal provided from a first chip of the first connector, a current charging voltage, and a current charging current. The charging voltage is adjusted according to the first equivalent resistance, the current charging current, and the target charging voltage. The first equivalent resistance is a resistance corresponding to a section on a power supply bus between the first chip and the charger.

A power delivery control chip of the invention is disposed in a charger. The charger is adapted to charge an electronic device via a cable. An end of the cable provides a target charging voltage to the electronic device via a first connector and the other end of the cable is coupled to the charger via a second connector. The power delivery control chip is configured so as to calculate a first equivalent resistance according to a first voltage sensing signal provided from a first chip of the first connector, a current charging voltage, and a current charging current, and adjust a charging voltage provided by the charger according to the first equivalent resistance, the current charging current, and the target charging voltage. The first equivalent resistance is a resistance corresponding to a section on a power supply bus between the first chip and the charger.

Based on the above, according to the embodiments of the invention, the equivalent resistances corresponding to the power supply bus are calculated according to the charging current and the voltage sensing signals respectively provided by the chips of the first connector and the second connector. Moreover, the charging voltage supplied to the power supply bus is adjusted according to the target charging voltage, the current charging current, and variations of the resistance values of the equivalent resistances corresponding to the power supply bus, so as to perform charging accurately and safely according to the degrees of aging of different cables as well as monitor the degrees of aging of the cables.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
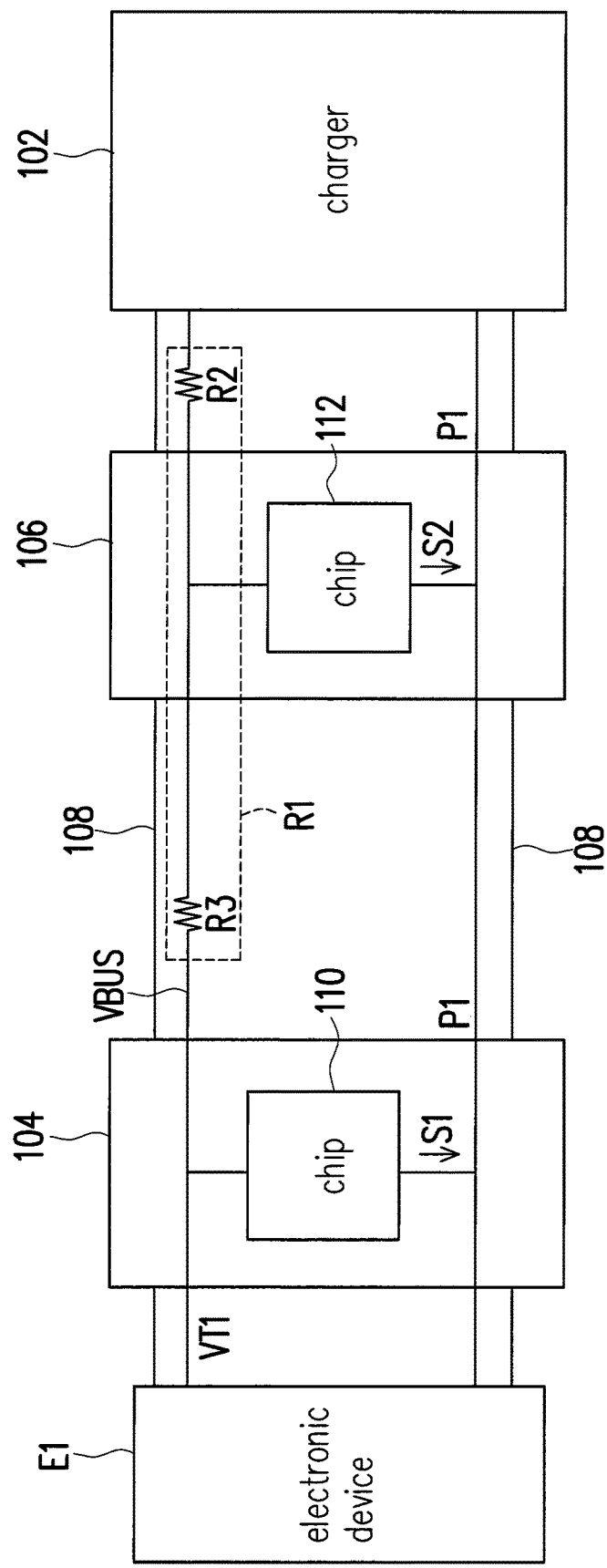
FIG. 1 is a schematic diagram showing a charger according to an embodiment of the invention.

FIG. 1 is a schematic diagram showing a charging device according to an embodiment of the invention. Please refer to FIG. 1. The charging device includes a charger 102, a connector 104, a connector 106, and a cable 108. An end of the cable 108 is coupled to the charger 102 via the connector 106 and the other end of the cable 108 provides a target charging voltage VT1 to an electronic device E1 via the connector 104. More specifically, the cable 108 includes a power supply bus VBUS, the connector 104 includes a chip 110, and the connector 106 includes a chip 112. The chip 110 and the chip 112 are coupled to the power supply bus VBUS. The chip 112 is capable of detecting a voltage on the power supply bus VBUS corresponding to the position of the connector 106 to generate a voltage sensing signal S2, and transmitting the voltage sensing signal S2 to the charger 102 via a data transmission pin P1 of the connector 106. Likewise, the chip 110 is capable of detecting a voltage on the power supply bus VBUS corresponding to the position of the connector 104 to generate a voltage sensing signal S1, and transmitting the voltage sensing signal S1 to the charger 102 via a data transmission pin P1 of the connector 104. The charger 102 calculates an equivalent resistance R3 corresponding to a section between the chip 112 and the chip 110 and an equivalent resistance R2 corresponding to a section between the chip 112 and the charger 102 on the power supply bus VBUS according to a current charging current, a current charging voltage, and the received voltage sensing signal S2 and voltage sensing signal S1, and adjusts a charging voltage to be provided to the power supply bus VBUS according to the equivalent resistance R3, the equivalent resistance R2, the current charging current, and the target charging voltage VT1.

For example, assuming that the target charging voltage VT1 is 5V, and the charger 102 provides a charging voltage of 5V and a charging current of 3 A at the beginning and the voltage sensing signals S2 and S1 indicate that the voltages detected by the chip 112 and the chip 110 are 4.8V and 4.6V respectively, the charger 102 may obtain that the equivalent resistance R2 is $(5-4.8)/3=0.067$ Ω and the equivalent resistance R3 is $(4.8-4.6)/3=0.067$ Ω through calculation. In order to ensure that the voltage measured on the chip 110 is 5V, the charger 102 may raise the charging voltage to 5.4V according to the equivalent resistances R3 and R2, the charging current, and the target charging voltage VT1, such that an output voltage provided by the connector 104 reaches the voltage value required by the target charging voltage VT1 (i.e., $5.4-(0.06\times3)-(0.067\times3)=5V$). By calculating the equivalent resistance values corresponding to different sections of the power supply bus VBUS according to the current charging voltage, the current charging current, and the voltage sensing signals respectively provided by the chips of the connector 104 and the connector 106 in this manner, and adjusting the charging voltage to be provided to the power supply bus VBUS according to the current charging current, the target charging voltage VT1, and variations of the resistance values of the equivalent resistances corresponding to different sections of the power supply bus VBUS, the target charging voltage VT1 is maintained at a fixed voltage (e.g., 5V) to be provided to the electronic device E1 for charging.

In another embodiment, the charger 102 may directly calculate an equivalent resistance R1 $(=R3+R2=(5-4.6)/3=0.13Ω)$ corresponding to a section on the power supply bus VBUS between the chip 110 and the charger 102 according to the provided current charging current, the current charging voltage, and the received voltage sensing signal S1, and adjust the charging voltage to be provided to the power supply bus VBUS according to the equivalent resistance R1, the current charging current, and the target charging voltage VT1, so as to ensure that the target charging voltage VT1 is maintained at a fixed voltage (e.g., 5V) to be provided to the electronic device E1 for charging.

In another embodiment, the charger 102 may directly calculate the equivalent resistance R2 $(=(5-4.8)/3=0.067Ω)$ corresponding to the section on the power supply bus VBUS between the chip 112 and the charger 102 according to the provided current charging current, the current charging voltage, and the received voltage sensing signal S2, to obtain the equivalent resistance R2 between the connector 106 and the charger for calculation in the subsequent processes.

In addition, when detecting variations of the resistance values of the equivalent resistances R3 and R2 (or the equivalent resistance R1) (for example, the resistance value increases due to aging of the cable 108), the charger 102 may stop charging or change to a charging specification smaller than the original charging current for charging, so as to prevent an excessive charging current from causing an overly high temperature of the cable 108 or causing damage to electronic components.

Figure 2:
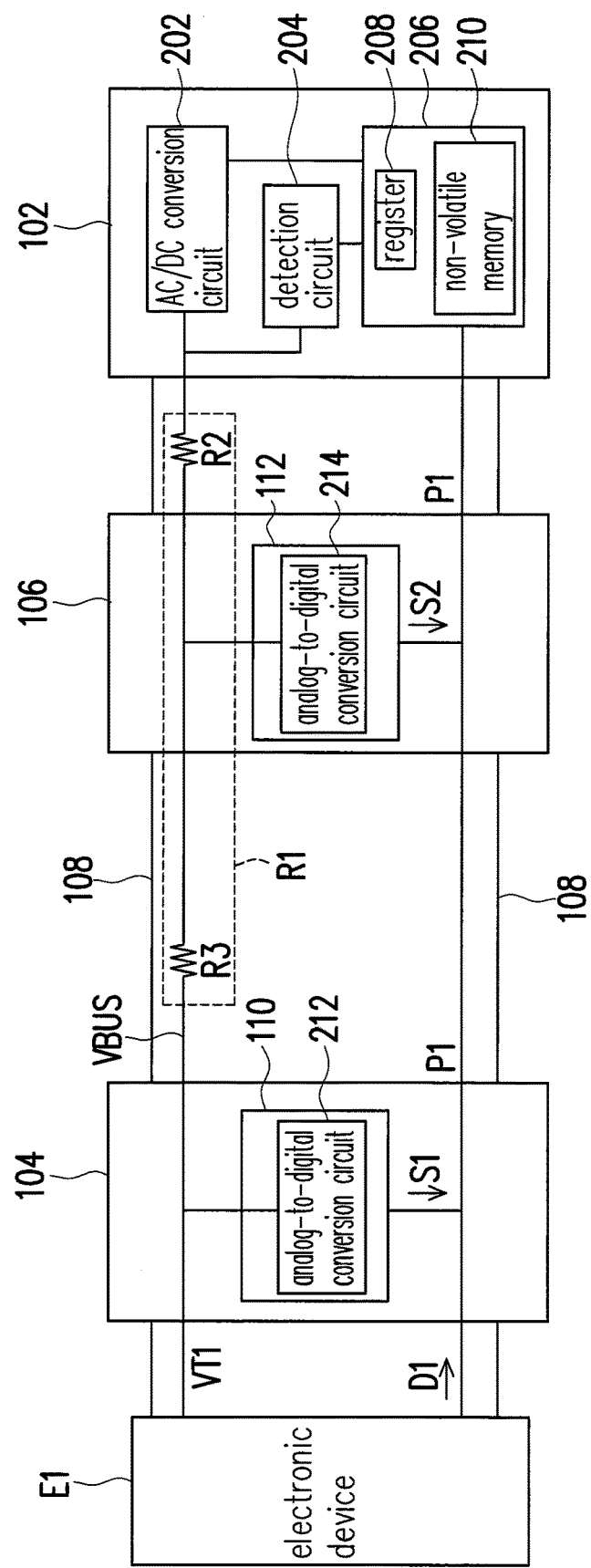
FIG. 2 is a schematic diagram showing a charger according to another embodiment of the invention.

FIG. 2 is a schematic diagram showing a charging device according to another embodiment of the invention. Please refer to FIG. 2. Specifically, in this embodiment, the charger 102 may include an AC/DC conversion circuit 202, a detection circuit 204, and a power delivery control chip 206. The AC/DC conversion circuit 202 is coupled to the power supply bus VBUS. The detection circuit 204 is coupled to the power supply bus VBUS. The power delivery control chip 206 is coupled to the AC/DC conversion circuit 202 and the detection circuit 204 and is coupled to the chip 110 and the chip 112 via the data transmission pins P1. The AC/DC conversion circuit 202 may convert an AC voltage into a DC voltage to provide a charging current. The detection circuit 204 may detect the charging voltage provided by the AC/DC conversion circuit 202. The detection circuit 204 is an analog-to-digital converter, for example, but the invention is not limited thereto. The power delivery control chip 206 may calculate the equivalent resistance R1 according to the voltage sensing signal S1, the current charging voltage, and the current charging current, or calculate the equivalent resistance R3 and the equivalent resistance R2 according to the voltage sensing signal S1, the voltage sensing signal S2, the current charging voltage, and the current charging current, and adjust the charging voltage provided by the AC/DC conversion circuit 202 according to the equivalent resistance R1 (or R3 and R2), the current charging current, and the target charging voltage VT1, wherein the method of calculating the equivalent resistances R3, R2, and R1 and the method of adjusting the charging voltage are as specified in the above embodiment and thus are not repeated hereinafter.

More specifically, the power delivery control chip 206 may include a register 208 and a non-volatile memory 210, wherein the register 208 may be implemented by a static random access memory (SRAM) and the non-volatile memory 210 may be implemented by a one-time programming (OTP) memory, for example. Nevertheless, the invention is not limited thereto. In this embodiment, the chip 110 and the chip 112 may be E-Marker chips, a connection interface of the connector 104 and the connector 106 may be a USB type-C interface, and the data transmission pins P1 of the connector 104 and the connector 106 may be configuration channel (CC) pins, for example. The chip 110 and the chip 112 respectively include analog-to-digital conversion circuits 212 and 214, which are respectively coupled to the power supply bus VBUS, so as to convert voltages on the power supply bus corresponding to the positions of the chip 110 and the chip 112 into the voltage sensing signal S1 and the voltage sensing signal S2. The register 208 in the power delivery control chip 206 may store N voltage sensing signals S1 and voltage sensing signals S2 that are detected latest, wherein N is a positive integer greater than 1. Moreover, in some embodiments, the register 208 may store the equivalent resistance R1 and equivalent resistances R3 and R2 that are calculated initially at the initial charging for determining whether the cable 108 has aged in the subsequent processes. The power delivery control chip 206 may calculate the latest equivalent resistance R1 according to the current charging current, the current charging voltage, and the voltage sensing signal S1 that is detected latest, or calculate the latest equivalent resistances R3 and R2 according to the current charging current, the current charging voltage, and the voltage sensing signal S1 and the voltage sensing signal S2 that are detected latest, so as to continuously monitor the variation of an impedance of the power supply bus VBUS. The register 208 may also store the latest equivalent resistances R1, R3, and R2 for calculation in the subsequent processes. The power delivery control chip 206 may adjust the charging voltage provided by the AC/DC conversion circuit 202 according to the latest equivalent resistance R1 (or the equivalent resistances R3 and R2), the current charging current, and the target charging voltage VT1, so as to instantly reflect the variation of the impedance of the power supply bus VBUS to accurately and safely perform charging according to the degree of aging of the cable 108.

Specifically, the non-volatile memory 210 may store predetermined charging information, which may include data of various charging specifications, such as the charging voltage, the charging current, the cable impedance, and so on. The power delivery control chip 206 may receive the charging specification data from the electronic device E1 via the data transmission pin P1 of the connector 104, and provide a predetermined charging voltage and a predetermined charging current corresponding to the charging specification data according to the predetermined charging information. For example, assuming that the charging specification data provided by the electronic device E1 specifies that a charging specification requirement of the electronic device E1 is 5V/3 A, the power delivery control chip 206 may provide a charging power supply of 5V/3 A according to the charging specification data.

In addition, the predetermined charging information stored in the non-volatile memory 210 may further include a predetermined resistance value, e.g., $0.1\Omega$, of the power supply bus VBUS corresponding to this charging specification. The power delivery control chip 206 determines that the currently coupled cable is a passive cable, and when the power delivery control chip 206 is unable to read the voltage sensing signal S1 and the voltage sensing signal S2, the power delivery control chip 206 supplements the current charging voltage of the charger 102 with a voltage (e.g., 0.3V) obtained by multiplying the charging current (e.g., 3 A) currently provided by the charger 102 by a predetermined resistance value (e.g., $0.1\Omega$) stored in the non-volatile memory 210, such that the charger 102 provides a charging voltage of 5.3V.

Furthermore, the power delivery control chip 206 may calculate a sum of the latest equivalent resistance R3 and the latest equivalent resistance R2 to obtain a latest resistance sum and determine whether a difference between the latest resistance sum and an initial resistance sum is greater than a tolerance value. The initial resistance sum is a resistance sum that the power delivery control chip 206 obtains by calculating the initial equivalent resistance R3 and the initial equivalent resistance R2 according to the predetermined charging voltage, the predetermined charging current, and the voltage sensing signal S1 and the voltage sensing signal S2 that are detected initially, and calculating the sum of the initial equivalent resistance R3 and the initial equivalent resistance R2. If the difference between the latest resistance sum and the initial resistance sum is greater than the tolerance value (e.g., $0.1\Omega$), the power delivery control chip 206 may control the AC/DC conversion circuit 202 to stop supplying the charging current, or in some embodiments, the power delivery control chip 206 may control the AC/DC conversion circuit 202 to change to a charging specification smaller than the original current for charging. For example, assuming that the charging specification data provided by the electronic device E1 specifies that the charging specification requirement of the electronic device E1 is 5V/3 A. Because the power delivery control chip 206 has determined that the latest resistance sum is greater than the initial resistance sum, the power delivery control chip 206 changes to provide a charging power supply of 5V/2 A according to the charging specification data of the electronic device E1, so as to accurately and safely provide the target charging voltage VT1 with a lower current corresponding to the degree of aging of the cable 108, wherein the method of calculating charging voltage compensation in the subsequent processes is as specified in the above embodiment and thus is not repeated hereinafter.

If the difference between the latest resistance sum and the initial resistance sum is not greater than the aforementioned tolerance value, the power delivery control chip 206 controls the AC/DC conversion circuit 202 to adjust the charging voltage according to the latest resistance sum, the current charging current, and the target charging voltage VT1. For example, assuming that the latest resistance sum is $0.19\Omega$, the initial resistance sum is $0.1\Omega$, and the difference ($0.09\Omega$) between the latest resistance sum and the initial resistance sum is smaller than the tolerance value ($0.1\Omega$), the power delivery control chip 206 may control the AC/DC conversion circuit 202 to raise the charging voltage according to the latest resistance sum, the current charging current, and the target charging voltage VT1, so as to provide the target charging voltage required by the electronic device E1.

In another embodiment, the power delivery control chip 206 may directly calculate to determine whether a difference between the latest equivalent resistance R1 and the initial resistance R1 is greater than the tolerance value. If the difference between the latest equivalent resistance R1 and the initial resistance R1 is greater than the tolerance value (e.g., $0.1\Omega$), the power delivery control chip 206 may control the AC/DC conversion circuit 202 to stop supplying the charging current, or in some embodiments, the power delivery control chip 206 may control the AC/DC conversion circuit 202 to change to a charging specification smaller than the original current for charging. If the difference between the latest equivalent resistance R1 and the initial resistance R1 is not greater than the tolerance value, the power delivery control chip 206 controls the AC/DC conversion circuit 202 to adjust the charging voltage according to the latest resistance R1, the current charging current, and the target charging voltage VT1.

Figure 3:
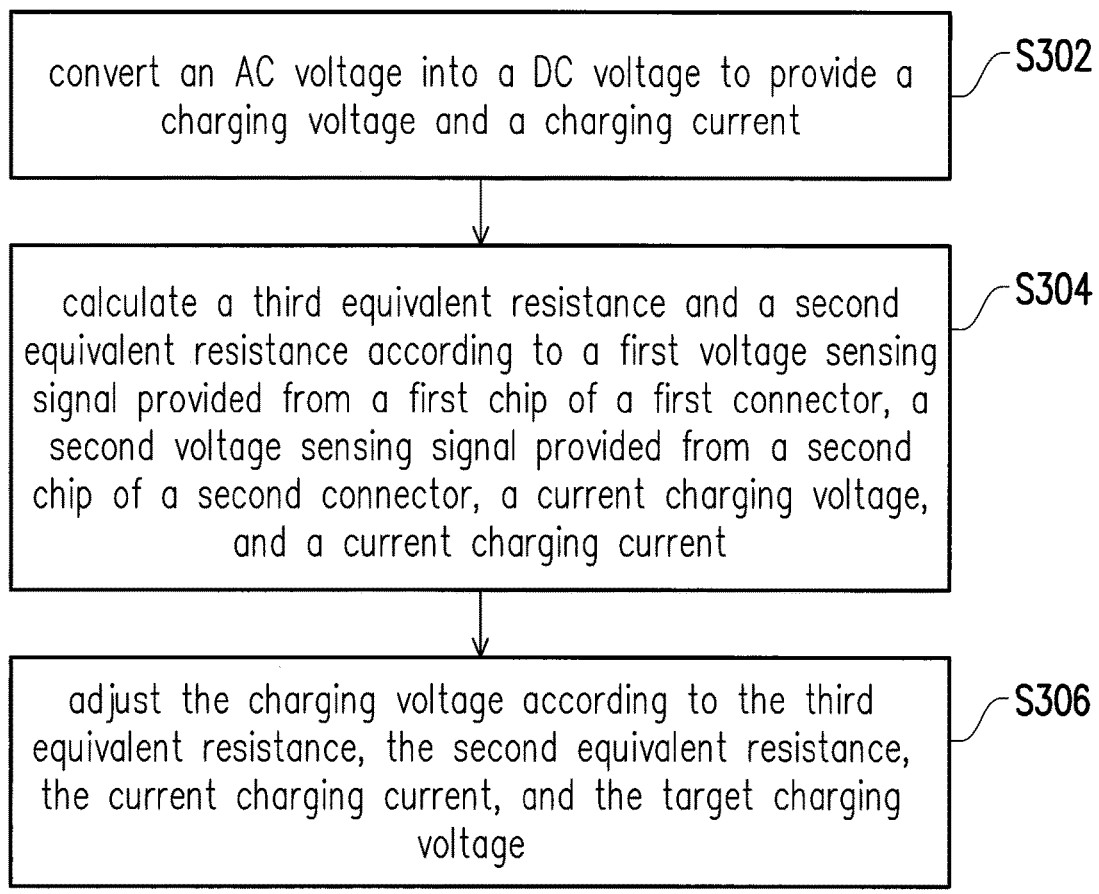
FIG. 3 is a flowchart showing a charging method of a charger according to an embodiment of the invention.

FIG. 3 is a flowchart showing a charging method of a charger according to an embodiment of the invention. It is known from the embodiment described above that the charging method of the charger is an adaptive charging method, which may include the following steps. First, an AC voltage is converted into a DC voltage to provide a charging voltage and a charging current (Step S302). Then, a third equivalent resistance and a second equivalent resistance are calculated according to a first voltage sensing signal provided from a first chip of a first connector, a second voltage sensing signal provided from a second chip of a second connector, a current charging voltage, and a current charging current (Step S304).

Specifically, the first chip may detect a voltage on a power supply bus corresponding to the position of the first connector to generate the first voltage sensing signal, and transmit the first voltage sensing signal to the charger via a data transmission pin of the first connector while the second chip may detect a voltage on the power supply bus corresponding to the position of the second connector to generate the second voltage sensing signal, and transmit the second voltage sensing signal to the charger via a data transmission pin of the second connector. The first chip and the second chip may be E-Marker chips, the connection interfaces of the first connector and the second connector may be the USB type-C interface, and the data transmission pins of the first connector and the second connector may be configuration channel (CC) pins, for example. At the beginning of charging, a predetermined charging voltage and a predetermined charging current corresponding to charging specification data of an electronic device may be provided according to predetermined charging information. In addition, an initial third equivalent resistance and an initial second equivalent resistance may be calculated according to the predetermined charging current, the predetermined charging voltage, and the first voltage sensing signal and the second voltage sensing signal that are detected initially. At last, the charging voltage is adjusted according to the third equivalent resistance, the second equivalent resistance, the current charging current, and the target charging voltage (Step S306), wherein the third equivalent resistance is a resistance corresponding to a section on the power supply bus of a cable between the first chip and the second chip, and the second equivalent resistance is a resistance corresponding to a section on the power supply bus between the second chip and the charger.

It should be noted that, in some embodiments, in Step S304, a first equivalent resistance may be calculated only according to the first voltage sensing signal provided from the first chip of the first connector, the current charging voltage, and the current charging current, wherein the first equivalent resistance is a resistance corresponding to a section on the power supply bus between the first chip and the charger. Then, in Step S306, the charging voltage is adjusted according to the first equivalent resistance, the current charging current, and the target charging voltage.

Figure 4:
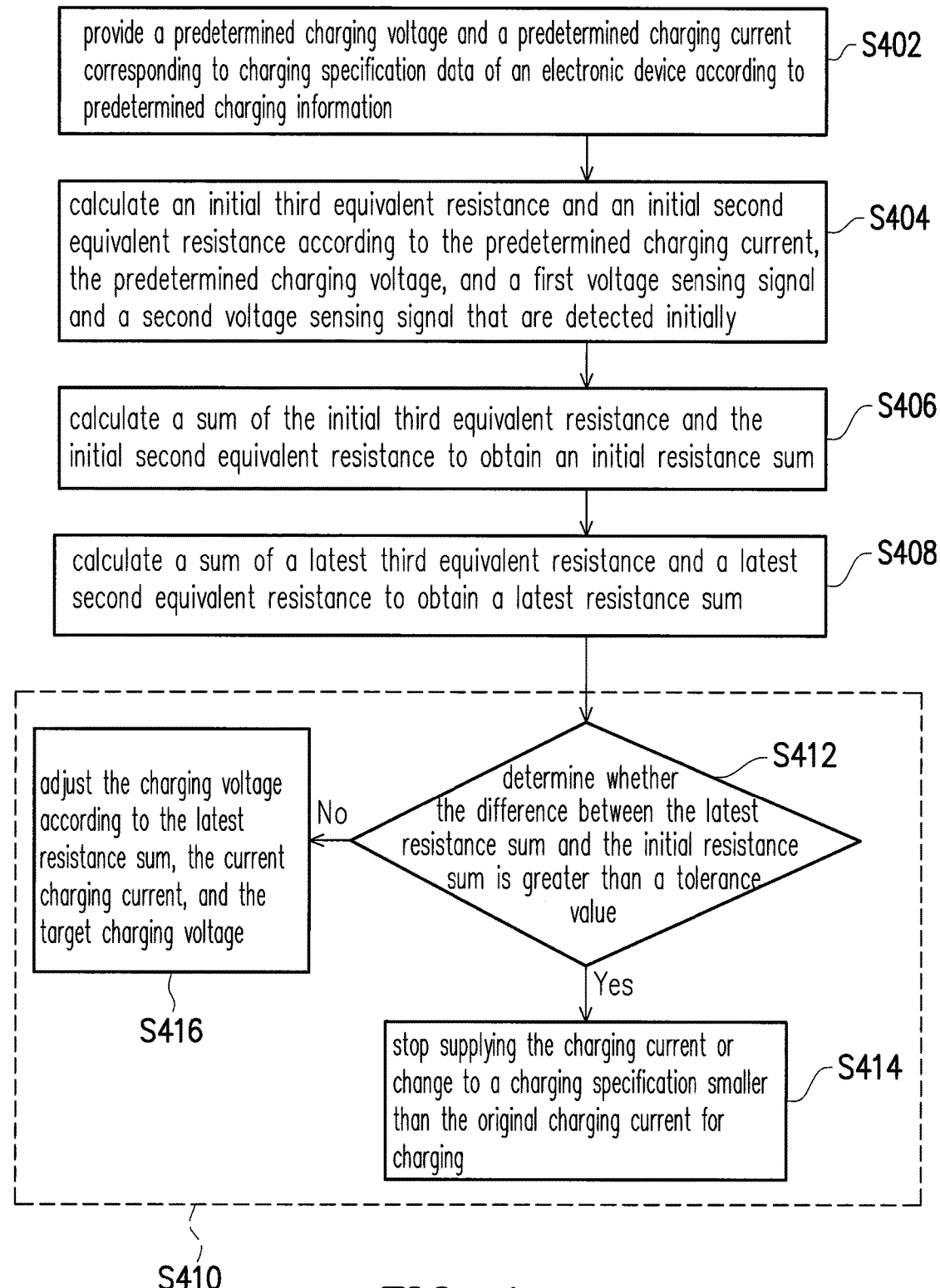
FIG. 4 is a flowchart showing a charging method of a charger according to an embodiment of the invention.

FIG. 4 is a flowchart showing a charging method of a charger according to another embodiment of the invention. Please refer to FIG. 4. Referring to FIG. 4, the adaptive charging method of the charger may include the following steps. First, a predetermined charging voltage and a predetermined charging current corresponding to charging specification data of an electronic device are provided according to predetermined charging information (Step S402). Then, an initial third equivalent resistance and an initial second equivalent resistance are calculated according to the predetermined charging current, the predetermined charging voltage, and a first voltage sensing signal and a second voltage sensing signal that are detected initially (Step S404). Next, a sum of the initial third equivalent resistance and the initial second equivalent resistance is calculated to obtain an initial resistance sum (Step S406). Thereafter, a sum of a latest third equivalent resistance and a latest second equivalent resistance is calculated to obtain a latest resistance sum (Step S408), and then whether to adjust the charging voltage is determined according to a difference between the latest resistance sum and the initial resistance sum (Step S410). More specifically, in Step S410, whether the difference between the latest resistance sum and the initial resistance sum is greater than a tolerance value may be determined (Step S412). If the difference between the latest resistance sum and the initial resistance sum is greater than the tolerance value, supply of the charging current is stopped or the charging is performed with a charging specification smaller than the original charging current instead (Step S414). If the difference between the latest resistance sum and the initial resistance sum is not greater than the tolerance value, the charging voltage is adjusted according to the latest resistance sum, the current charging current, and the target charging voltage (Step S416).

It should be noted that, in some embodiments, in Step S404, an initial first equivalent resistance may be calculated according to the predetermined charging current, the predetermined charging voltage, and the first voltage sensing signal that is detected initially, and the charging voltage may be adjusted directly according to a difference between the latest first equivalent resistance and the initial first equivalent resistance. For example, whether the difference between the latest first equivalent resistance and the initial first equivalent resistance is greater than the tolerance value is determined, and if the difference between the latest first equivalent resistance and the initial first equivalent resistance is greater than the tolerance value, supply of the charging current is stopped or the charging is performed with a charging current smaller than the predetermined charging current corresponding to the charging specification instead. If the difference between the latest first equivalent resistance and the initial first equivalent resistance is not greater than the tolerance value, a power delivery control chip adjusts the charging voltage according to the latest first equivalent resistance, the current charging current, and the target charging voltage.

Thus, by performing the adaptive charging method described in the above embodiment, the charging is performed effectively according to the degrees of aging of different cables, so as to ensure charging safety. It is worth noting that, in some embodiments, the aforementioned charging method may be used only when the charging current is greater than a specific value. For example, the power delivery control chip may initiate the aforementioned charging method only when the charging current is greater than the predetermined charging current (e.g., 3 A) corresponding to the charging specification data.

It should be noted that, in different application contexts, the related calculation functions of the power delivery control chip 206 may be implemented as software, firmware, or hardware by using general programming languages (e.g., C or C++), hardware description languages (e.g., Verilog HDL or VHDL), or other suitable programming languages. The software (or firmware) capable of executing the related functions may be deployed as any known computer-accessible media, such as magnetic tapes, semiconductor memories, magnetic disks, and compact disks (e.g., CD-ROM or DVD-ROM), or the software (or firmware) may be transmitted through the Internet, wired communication, wireless communication, or other communication media. The software (or firmware) may be stored in an accessible medium of a computer for a processor of the computer to access/execute programming codes of the software (firmware). In addition, the device and method of the invention may be implemented by a combination of hardware and software.

In conclusion, according to the embodiments of the invention, the equivalent resistance values corresponding to different sections of the power supply bus are calculated according to the charging current and the voltage sensing signals respectively provided by the chips of the first connector and the second connector. Moreover, the charging voltage supplied to the power supply bus is adjusted according to the target charging voltage, the current charging current, and variations of the resistance values of the equivalent resistances corresponding to different sections of the power supply bus, so as to perform charging accurately and safely according to the degrees of aging of different cables as well as monitor the degrees of aging of the cables.

What is claimed is:

1. A charger adapted to charge an electronic device via a cable, wherein an end of the cable provides a target charging voltage to the electronic device via a first connector and the other end of the cable is coupled to the charger via a second connector, the charger comprising:
    an AC/DC conversion circuit coupled to a power supply bus of the cable and converting an AC voltage into a DC voltage to provide a charging voltage and a charging current; and
    a power delivery control chip calculating a first equivalent resistance according to a first voltage sensing signal provided from a first chip of the first connector, a current charging voltage, and a current charging current, and adjusting the charging voltage provided by the AC/DC conversion circuit according to the first equivalent resistance, the current charging current, and the target charging voltage, wherein the first equivalent resistance is a resistance corresponding to a section on the power supply bus between the first chip and the charger.

2. The charger according to claim 1, wherein the first chip detects a voltage on the power supply bus corresponding to a position of the first connector to generate the first voltage sensing signal and transmits the first voltage sensing signal to the charger via a data transmission pin of the first connector.

3. The charger according to claim 1, wherein the power delivery control chip further comprises:
    a non-volatile memory storing predetermined charging information, wherein the power delivery control chip receives charging specification data of the electronic device via a data transmission pin of the first connector, and the power delivery control chip provides a predetermined charging voltage and a predetermined charging current corresponding to the charging specification data according to the predetermined charging information.

4. The charger according to claim 3, wherein the power delivery control chip further comprises:
    a register storing N number of first voltage sensing signals that are detected latest, wherein N is a positive integer greater than 1, and the power delivery control chip calculates a latest first equivalent resistance according to the current charging current, the current charging voltage, and the first voltage sensing signal that is detected latest.

5. The charger according to claim 4, wherein the power delivery control chip calculates an initial first equivalent resistance according to the predetermined charging current, the predetermined charging voltage, and the first voltage sensing signal that is detected initially, and the register further stores the initial first equivalent resistance.

6. The charger according to claim 5, wherein the power delivery control chip determines whether a difference between the latest first equivalent resistance and the initial first equivalent resistance is greater than a tolerance value, and the power delivery control chip controls the AC/DC conversion circuit to stop providing the charging current or to change to perform charging with a charging current smaller than the predetermined charging current corresponding to a charging specification if the difference between the latest first equivalent resistance and the initial first equivalent resistance is greater than the tolerance value, and the power delivery control chip controls the AC/DC conversion circuit to adjust the charging voltage according to the latest first equivalent resistance, the current charging current, and the target charging voltage if the difference between the latest first equivalent resistance and the initial first equivalent resistance is not greater than the tolerance value.

7. The charger according to claim 1, wherein the power delivery control chip further calculates a second equivalent resistance and a third equivalent resistance according to a second voltage sensing signal provided from a second chip of the second connector, the current charging voltage, and the current charging current, wherein the second equivalent resistance is a resistance corresponding to a section on the power supply bus between the second chip and the charger, and the third equivalent resistance is a resistance corresponding to a section on the power supply bus between the first chip and the second chip, and the power delivery control chip adjusts the charging voltage provided by the AC/DC conversion circuit according to the second equivalent resistance, the third equivalent resistance, the current charging current, and the target charging voltage.

8. The charger according to claim 7, wherein the first chip detects a voltage on the power supply bus corresponding to the position of the first connector to generate the first voltage sensing signal and transmits the first voltage sensing signal to the charger via a data transmission pin of the first connector, and the second chip detects a voltage on the power supply bus corresponding to a position of the second connector to generate the second voltage sensing signal and transmits the second voltage sensing signal to the charger via a data transmission pin of the second connector.

9. The charger according to claim 7, wherein the power delivery control chip further comprises:
    a non-volatile memory storing predetermined charging information, wherein the power delivery control chip receives charging specification data of the electronic device via a data transmission pin of the first connector, and the power delivery control chip provides a predetermined charging voltage and a predetermined charging current corresponding to the charging specification data according to the predetermined charging information.

10. The charger according to claim 9, wherein the power delivery control chip further comprises:
    a register storing number of N first voltage sensing signals and second voltage sensing signals that are detected latest, wherein N is a positive integer greater than 1, and the power delivery control chip calculates a latest second equivalent resistance and a latest third equivalent resistance according to the current charging current, the current charging voltage, and the first voltage sensing signal and the second voltage sensing signal that are detected latest, and calculates a sum of the latest second equivalent resistance and the latest third equivalent resistance to obtain a latest resistance sum.

11. The charger according to claim 10, wherein the power delivery control chip calculates an initial second equivalent resistance and an initial third equivalent resistance according to the predetermined charging current, the predetermined charging voltage, and the first voltage sensing signal and the second voltage sensing signal that are detected initially and calculates a sum of the initial second equivalent resistance and the initial third equivalent resistance to obtain an initial resistance sum, and the register further stores the initial second equivalent resistance and the initial third equivalent resistance.

12. The charger according to claim 11, wherein the power delivery control chip determines whether a difference between the latest resistance sum and the initial resistance sum is greater than a tolerance value, and the power delivery control chip controls the AC/DC conversion circuit to stop providing the charging current or to change to perform charging with a charging current smaller than the predetermined charging current corresponding to the charging specification if the difference between the latest resistance sum and the initial resistance sum is greater than the tolerance value, and the power delivery control chip controls the AC/DC conversion circuit to adjust the charging voltage according to the latest resistance sum, the current charging current, and the target charging voltage if the difference between the latest resistance sum and the initial resistance sum is not greater than the tolerance value.

13. A charging method of a charger adapted to charge an electronic device via a cable, wherein an end the cable provides a target charging voltage to the electronic device via a first connector and the other end of the cable is coupled to the charger via a second connector, the charging method of the charger comprising:
converting an AC voltage into a DC voltage to provide a charging voltage and a charging current;
calculating a first equivalent resistance according to a first voltage sensing signal provided from a first chip of the first connector, a current charging voltage, and a current charging current; and
adjusting the charging voltage according to the first equivalent resistance, the current charging current, and the target charging voltage, wherein the first equivalent resistance is a resistance corresponding to a section on a power supply bus between the first chip and the charger.

14. The charging method of the charger according to claim 13, wherein the first chip detects a voltage on the power supply bus corresponding to a position of the first connector to generate the first voltage sensing signal and transmits the first voltage sensing signal to the charger via a data transmission pin of the first connector.

15. The charging method of the charger according to claim 13, comprising:
providing a predetermined charging voltage and a predetermined charging current corresponding to charging specification data according to predetermined charging information.

16. The charging method of the charger according to claim 15, comprising:
storing number of N first voltage sensing signals that are detected latest, wherein N is a positive integer greater than 1; and
calculating a latest first equivalent resistance according to the charging current, the current charging voltage, and the first voltage sensing signal that is detected latest.

17. The charging method of the charger according to claim 16, comprising:
calculating an initial first equivalent resistance according to the predetermined charging current, the predetermined charging voltage, and the first voltage sensing signal that is detected initially; and
storing the initial first equivalent resistance.

18. The charging method of the charger according to claim 17, comprising:
determining whether a difference between the latest first equivalent resistance and the initial first equivalent resistance is greater than a tolerance value, wherein supply of the charging current is stopped or charging with a charging current smaller than the predetermined charging current corresponding to a charging specification is performed if the difference between the latest first equivalent resistance and the initial first equivalent resistance is greater than the tolerance value, and the charging voltage is adjusted according to the latest first equivalent resistance, the current charging current, and the target charging voltage if the difference between the latest first equivalent resistance and the initial first equivalent resistance is not greater than the tolerance value.

19. The charging method of the charger according to claim 13, comprising:
calculating a second equivalent resistance and a third equivalent resistance according to a second voltage sensing signal provided from a second chip of the second connector, the current charging voltage, and the current charging current, wherein the second equivalent resistance is a resistance corresponding to a section on the power supply bus between the second chip and the charger, and the third equivalent resistance is a resistance corresponding to a section on the power supply bus between the first chip and the second chip; and
adjusting the charging voltage according to the second equivalent resistance, the third equivalent resistance, the current charging current, and the target charging voltage.

20. The charging method of the charger according to claim 19, wherein the first chip detects a voltage on the power supply bus corresponding to the position of the first connector to generate the first voltage sensing signal and transmits the first voltage sensing signal to the charger via a data transmission pin of the first connector, and the second chip detects a voltage on the power supply bus corresponding to a position of the second connector to generate the second voltage sensing signal and transmits the second voltage sensing signal to the charger via a data transmission pin of the second connector.

21. The charging method of the charger according to claim 19, comprising:
providing a predetermined charging voltage and a predetermined charging current corresponding to charging specification data according to predetermined charging information.

22. The charging method of the charger according to claim 21, comprising:
storing number of N first voltage sensing signals and second voltage sensing signals that are detected latest, wherein N is a positive integer greater than 1;
calculating a latest second equivalent resistance and a latest third equivalent resistance according to the current charging current, the current charging voltage, and the first voltage sensing signal and the second voltage sensing signal that are detected latest; and calculating a sum of the latest second equivalent resistance and the latest third equivalent resistance to obtain a latest resistance sum.

23. The charging method of the charger according to claim 22, comprising:
calculating an initial second equivalent resistance and an initial third equivalent resistance according to the predetermined charging current, the predetermined charging voltage, and the first voltage sensing signal and the second voltage sensing signal that are detected initially;
calculating a sum of the initial second equivalent resistance and the initial third equivalent resistance to obtain an initial resistance sum; and
storing the initial second equivalent resistance and the initial third equivalent resistance.

24. The charging method of the charger according to claim 23, comprising:
determining whether a difference between the latest resistance sum and the initial resistance sum is greater than a tolerance value, wherein supply of the charging current is stopped or charging with a charging current smaller than the predetermined charging current corresponding to the charging specification is performed if the difference between the latest resistance sum and the initial resistance sum is greater than the tolerance value, and the charging voltage is adjusted according to the latest resistance sum, the current charging current, and the target charging voltage if the difference between the latest resistance sum and the initial resistance sum is not greater than the tolerance value.

25. A power delivery control chip disposed in a charger adapted to charge an electronic device via a cable, wherein an end the cable provides a target charging voltage to the electronic device via a first connector and the other end of the cable is coupled to the charger via a second connector, the power delivery control chip being configured to:
calculate a first equivalent resistance according to a first voltage sensing signal provided from a first chip of the first connector, a current charging voltage, and a current charging current, and adjust a charging voltage provided by the charger according to the first equivalent resistance, the current charging current, and the target charging voltage, wherein the first equivalent resistance is a resistance corresponding to a section on a power supply bus between the first chip and the charger.

26. The power delivery control chip according to claim 25, wherein the first chip detects a voltage on the power supply bus corresponding to a position of the first connector to generate the first voltage sensing signal and transmits the first voltage sensing signal to the charger via a data transmission pin of the first connector.

27. The power delivery control chip according to claim 25, comprising:
a non-volatile memory storing predetermined charging information, wherein the power delivery control chip receives charging specification data of the electronic device via a data transmission pin of the first connector, and the power delivery control chip provides a predetermined charging voltage and a predetermined charging current corresponding to the charging specification data according to the predetermined charging information.

28. The power delivery control chip according to claim 27, further comprising:
a register storing number of N first voltage sensing signals that are detected latest, wherein N is a positive integer greater than 1, and the power delivery control chip calculates a latest first equivalent resistance according to the charging current, the charging voltage, and the first voltage sensing signal that is detected latest.

29. The power delivery control chip according to claim 28, wherein the power delivery control chip calculates an initial first equivalent resistance according to the predetermined charging current, the predetermined charging voltage, and the first voltage sensing signal that is detected initially, and the register further stores the initial first equivalent resistance.

30. The power delivery control chip according to claim 29, wherein the power delivery control chip determines whether a difference between the latest first equivalent resistance and the initial first equivalent resistance is greater than a tolerance value, and the power delivery control chip controls the charger to stop providing the charging current or change to a charging current smaller than the predetermined charging current corresponding to a charging specification to perform charging if the difference between the latest first equivalent resistance and the initial first equivalent resistance is greater than the tolerance value, and the power delivery control chip controls the charger to adjust the charging voltage according to the latest first equivalent resistance, the current charging current, and the target charging voltage if the difference between the latest first equivalent resistance and the initial first equivalent resistance is not greater than the tolerance value.

31. The power delivery control chip according to claim 25, wherein the power delivery control chip further calculates a second equivalent resistance and a third equivalent resistance according to a second voltage sensing signal provided from a second chip of the second connector, the current charging voltage, and the current charging current, wherein the second equivalent resistance is a resistance corresponding to a section on the power supply bus between the second chip and the charger, and the third equivalent resistance is a resistance corresponding to a section on the power supply bus between the first chip and the second chip, and the power delivery control chip adjusts the charging voltage provided by the charger according to the second equivalent resistance, the third equivalent resistance, the current charging current, and the target charging voltage.

32. The power delivery control chip according to claim 31, wherein the first chip detects a voltage on the power supply bus corresponding to the position of the first connector to generate the first voltage sensing signal and transmits the first voltage sensing signal to the charger via a data transmission pin of the first connector, and the second chip detects a voltage on the power supply bus corresponding to a position of the second connector to generate the second voltage sensing signal and transmits the second voltage sensing signal to the charger via a data transmission pin of the second connector.

33. The power delivery control chip according to claim 31, wherein the power delivery control chip further comprises:
a non-volatile memory storing predetermined charging information, wherein the power delivery control chip receives charging specification data of the electronic device via the data transmission pin of the first connector, and the power delivery control chip provides a predetermined charging voltage and a predetermined charging current corresponding to the charging specification data according to the predetermined charging information.

34. The power delivery control chip according to claim 33, wherein the power delivery control chip further comprises:
a register storing number of N first voltage sensing signals and second voltage sensing signals that are detected latest, wherein N is a positive integer greater than 1, and the power delivery control chip calculates a latest second equivalent resistance and a latest third equivalent resistance according to the current charging current, the current charging voltage, and the first voltage sensing signal and the second voltage sensing signal that are detected latest, and calculates a sum of the latest second equivalent resistance and the latest third equivalent resistance to obtain a latest resistance sum.

35. The power delivery control chip according to claim 34, wherein the power delivery control chip calculates an initial second equivalent resistance and an initial third equivalent resistance according to the predetermined charging current, the predetermined charging voltage, and the first voltage sensing signal and the second voltage sensing signal that are detected initially and calculates a sum of the initial second equivalent resistance and the initial third equivalent resistance to obtain an initial resistance sum, and the register further stores the initial second equivalent resistance and the initial third equivalent resistance.

36. The power delivery control chip according to claim 35, wherein the power delivery control chip determines whether a difference between the latest resistance sum and the initial resistance sum is greater than a tolerance value, and the power delivery control chip controls the charger to stop providing the charging current or to change to perform charging with a charging current smaller than the predetermined charging current corresponding to the charging specification if the difference between the latest resistance sum and the initial resistance sum is greater than the tolerance value, and the power delivery control chip controls the charger to adjust the charging voltage according to the latest resistance sum, the current charging current, and the target charging voltage if the difference between the latest resistance sum and the initial resistance sum is not greater than the tolerance value.

* * * * *